United States Patent [19]

Kubo et al.

[11] 4,408,275

[45] Oct. 4, 1983

[54] DATA PROCESSING SYSTEM WITH DATA CROSS-BLOCK-DETECTION FEATURE

[75] Inventors: Kanji Kubo, Hadano; Kenichi Wada, Zama, both of Japan

[73] Assignee: Hitachi, Ltd., Tokyo, Japan

[21] Appl. No.: 221,325

[22] Filed: Dec. 29, 1980

[30] Foreign Application Priority Data

Dec. 26, 1979 [JP] Japan ................................ 54-169657

[51] Int. Cl.³ .......................... G06F 11/30; G11C 7/00

[52] U.S. Cl. ..................................... 364/200; 364/900

[58] Field of Search ... 364/200 MS File, 900 MS File

[56] References Cited

U.S. PATENT DOCUMENTS

| | | | |
|---|---|---|---|
| 3,840,861 | 10/1974 | Amdahl et al. | 364/200 |
| 3,858,183 | 12/1974 | Amdahl et al. | 364/200 |
| 4,068,300 | 1/1978 | Bachman | 364/200 |
| 4,080,648 | 3/1978 | Asano et al. | 364/200 |

OTHER PUBLICATIONS

Principles of Operation of IBM System/370.

*Primary Examiner*—Felix D. Gruber
*Assistant Examiner*—D. H. Rutherford
*Attorney, Agent, or Firm*—Antonelli, Terry & Wands

[57] ABSTRACT

A data processing system is disclosed in which it is detected whether or not data to be read out from a buffer memory with a single access are spread over a plurality of blocks, which are used as the unit for storing data in the buffer memory, and, when the presence of block cross is detected, addresses of blocks including a desired operand are generated as addresses in banks making up the buffer memory, whereby the operand is read out from adjacent blocks by a single read-out operation.

12 Claims, 14 Drawing Figures

FIG. 5

| CASE | INPUT | | | | OUTPUT | | | | | | | | | | | |
|---|---|---|---|---|---|---|---|---|---|---|---|---|---|---|---|---|
| | SIGNAL ON LINE 90A | BITS ON LINE 20A | | | WHEN SIGNAL ON LINE 38C AND SIGNAL ON LINE 38D ARE "0" | | | | | | | WHEN SIGNAL ON LINE 38C IS "0" AND SIGNAL ON LINE 38D IS "1" | | WHEN SIGNAL ON LINE 38C IS "1" AND SIGNAL ON LINE 38D IS "0" | |
| | | | | | BITS ON LINE 32A | BITS ON LINE 38A | | | BITS ON LINE 38B | | | BITS ON LINE 38F | BITS ON LINE 32A | BITS ON LINE 38F | BITS ON LINE 32A |
| | | 26 | 27 | 28 | 0 ~ 25 | 26 | 27 | 28 | 26 | 27 | 28 | 0 ~ 25 | 0 ~ 25 | 0 ~ 25 | 0 ~ 25 |
| 1 | 0 | 0 | 0 | 0 | BITS 0 TO 25 OF PHYSICAL ADDRESS OBTAINED BY CONVERTING LOGICAL ADDRESS ON LINE 20A BY ADDRESS CONVERTING CIRCUIT 32 (PHYSICAL ADDRESS INDICATING FIRST BLOCK) | 0 | 0 | 0 | 0 | 0 | 1 | BITS 0 TO 25 OF DATA OBTAINED BY ADDING "64" TO LOGICAL ADDRESS ON LINE 20A (LOGICAL ADDRESS INDICATING NEXT BLOCK) | BITS 0 TO 25 OF PHYSICAL ADDRESS OBTAINED BY CONVERTING LOGICAL ADDRESS ON LINE 38F BY ADDRESS CONVERTING CIRCUIT 32 (PHYSICAL ADDRESS INDICATING NEXT BLOCK) | BITS 0 TO 25 OF DATA OBTAINED BY SUBTRACTING "64" FROM LOGICAL ADDRESS ON LINE 20A (LOGICAL ADDRESS INDICATING PRECEDING BLOCK) | BITS 0 TO 25 OF PHYSICAL ADDRESS OBTAINED BY CONVERTING LOGICAL ADDRESS ON LINE 38F BY ADDRESS CONVERTING CIRCUIT 32 (PHYSICAL ADDRESS INDICATING PRECEDING BLOCK) |
| 2 | 0 | 0 | 0 | 1 | | 0 | 1 | 0 | 0 | 0 | 1 | | | | |
| 3 | 0 | 0 | 1 | 0 | | 0 | 1 | 0 | 0 | 1 | 1 | | | | |
| 4 | 0 | 0 | 1 | 1 | | 1 | 0 | 0 | 0 | 1 | 1 | | | | |
| 5 | 0 | 1 | 0 | 0 | | 1 | 0 | 0 | 1 | 0 | 1 | | | | |
| 6 | 0 | 1 | 0 | 1 | | 1 | 1 | 0 | 1 | 0 | 1 | | | | |
| 7 | 0 | 1 | 1 | 0 | | 1 | 1 | 0 | 1 | 1 | 1 | | | | |
| 8 | 0 | 1 | 1 | 1 | | 0 | 0 | 0 | 1 | 1 | 1 | | | | |
| 9 | 1 | 0 | 0 | 0 | | 0 | 0 | 0 | 1 | 1 | 1 | | | | |
| 10 | 1 | 0 | 0 | 1 | | 0 | 0 | 0 | 0 | 0 | 1 | | | | |
| 11 | 1 | 0 | 1 | 0 | | 0 | 1 | 0 | 0 | 0 | 1 | | | | |
| 12 | 1 | 0 | 1 | 1 | | 0 | 1 | 0 | 0 | 1 | 1 | | | | |
| 13 | 1 | 1 | 0 | 0 | | 1 | 0 | 0 | 0 | 1 | 1 | | | | |
| 14 | 1 | 1 | 0 | 1 | | 1 | 0 | 0 | 1 | 0 | 1 | | | | |
| 15 | 1 | 1 | 1 | 0 | | 1 | 1 | 0 | 1 | 0 | 1 | | | | |
| 16 | 1 | 1 | 1 | 1 | | 1 | 1 | 0 | 1 | 1 | 1 | | | | |

FIG. 7

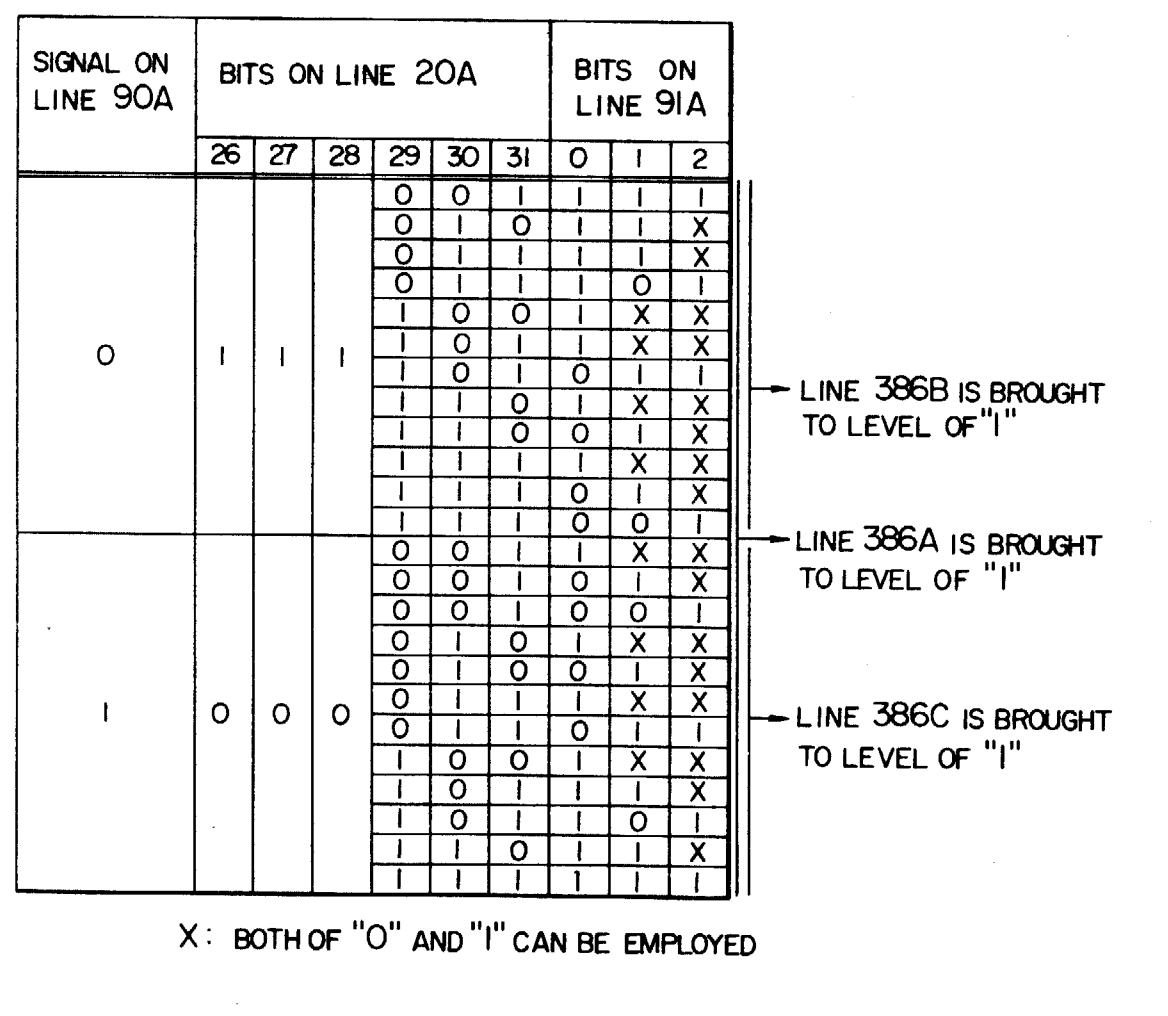

| SIGNAL ON LINE 90A | BITS ON LINE 20A | | | | | | BITS ON LINE 91A | | |
|---|---|---|---|---|---|---|---|---|---|
| | 26 | 27 | 28 | 29 | 30 | 31 | 0 | 1 | 2 |
| 0 | 1 | 1 | 1 | 0 | 0 | 1 | 1 | 1 | 1 |
| | | | | 0 | 1 | 0 | 1 | 1 | X |
| | | | | 0 | 1 | 1 | 1 | 1 | X |
| | | | | 0 | 1 | 1 | 1 | 0 | 1 |
| | | | | 1 | 0 | 0 | 1 | X | X |
| | | | | 1 | 0 | 1 | 1 | X | X |
| | | | | 1 | 0 | 1 | 0 | 1 | 1 |
| | | | | 1 | 1 | 0 | 1 | X | X |
| | | | | 1 | 1 | 0 | 0 | 1 | X |
| | | | | 1 | 1 | 1 | 1 | X | X |
| | | | | 1 | 1 | 1 | 0 | 1 | X |
| | | | | 1 | 1 | 1 | 0 | 0 | 1 |
| 1 | 0 | 0 | 0 | 0 | 0 | 1 | 1 | X | X |
| | | | | 0 | 0 | 1 | 0 | 1 | X |
| | | | | 0 | 0 | 1 | 0 | 0 | 1 |
| | | | | 0 | 1 | 0 | 1 | X | X |
| | | | | 0 | 1 | 0 | 0 | 1 | X |
| | | | | 0 | 1 | 1 | 1 | X | X |
| | | | | 0 | 1 | 1 | 0 | 1 | 1 |
| | | | | 1 | 0 | 0 | 1 | X | X |
| | | | | 1 | 0 | 1 | 1 | 1 | X |
| | | | | 1 | 0 | 1 | 1 | 0 | 1 |
| | | | | 1 | 1 | 0 | 1 | 1 | X |
| | | | | 1 | 1 | 1 | 1 | 1 | 1 |

→ LINE 386B IS BROUGHT TO LEVEL OF "1"

→ LINE 386A IS BROUGHT TO LEVEL OF "1"

→ LINE 386C IS BROUGHT TO LEVEL OF "1"

X: BOTH OF "O" AND "1" CAN BE EMPLOYED

FIG. 10

| ALIGN FIELD | DECODER 98 | SELECTOR 910 | SELECTOR 932 | SELECTOR 936 | SELECTOR 930 | SELECTOR 960 | NOTES |
|---|---|---|---|---|---|---|---|
| 0 0 0 0 | * | * | * | * | * | * | |
| 0 0 0 1 | "0" | 913A | * | * | "Y'" | 962A | WORD OVERLAP PROCESSING |
| 0 0 1 0 | "0" | "0" | "Y" | "-X" | "Y-X" | 962A | |
| 0 0 1 1 | "0" | "0" | "Y" | "13" | "Y+13" | 962A | TR INSTRUCTION |
| 0 1 0 0 | "0" | "0" | "Y" | * | "Y" | 962A | NI INSTRUCTION |
| 0 1 0 1 | "0" | 911A | "Y" | "-X" | "Y-X" | 966A | MVC INSTRUCTION |
| 0 1 1 0 | "0" | 919A | "Y" | * | "Y" | 962A | INTERRUPTION PROCESSING |
| 0 1 1 1 | "0" | 72A | "Y" | * | "Y" | 962A | |
| 1 0 0 0 | "0" | 72A | "X" | * | "X" | 962A | |
| 1 0 0 1 | "0" | 911A | "Y" | * | "Y" | 962A | NC/OC INSTRUCTION |
| 1 0 1 0 | "0" | 913A | "Y" | * | "Y" | 962A | ED INSTRUCTION |
| 1 0 1 1 | "0" | 72A | * | * | "Z" | 962A | |
| 1 1 0 0 | "1" | 919A | "Y" | "9" | "Y+9" | 964A | |
| 1 1 0 1 | "1" | 915A | "X" | "9" | "X+9" | 964A | AP/SP INSTRUCTION |
| 1 1 1 0 | "1" | 917A | "Y" | "9" | "Y+9" | 964A | AP/SP INSTRUCTION |
| 1 1 1 1 | "1" | "0" | "Y" | "9" | "Y+9" | 964A | MVO INSTRUCTION |

| OUTPUT OF CIRCUIT 91 | OUTPUT OF LEFT PATTERN GENERATOR | OUTPUT OF RIGHT PATTERN GENERATOR |
|---|---|---|
| 0 0 0 | 1 0 0 0 0 0 0 0 | 0 0 0 0 0 0 0 1 |
| 0 0 1 | 1 1 0 0 0 0 0 0 | 0 0 0 0 0 0 1 1 |
| 0 1 0 | 1 1 1 0 0 0 0 0 | 0 0 0 0 0 1 1 1 |
| 0 1 1 | 1 1 1 1 0 0 0 0 | 0 0 0 0 1 1 1 1 |
| 1 0 0 | 1 1 1 1 1 0 0 0 | 0 0 0 1 1 1 1 1 |
| 1 0 1 | 1 1 1 1 1 1 0 0 | 0 0 1 1 1 1 1 1 |
| 1 1 0 | 1 1 1 1 1 1 1 0 | 0 1 1 1 1 1 1 1 |
| 1 1 1 | 1 1 1 1 1 1 1 1 | 1 1 1 1 1 1 1 1 |

DATA PROCESSING SYSTEM WITH DATA CROSS-BLOCK-DETECTION FEATURE

CROSS-REFERENCES TO RELATED APPLICATIONS

This application relates to improvements in a data processing system such as disclosed in application Ser. No. 79,247 filed Sept. 27, 1979 by Kenichi Wada and Mamoru Hinai, now U.S. Pat. No. 4,317,170, assigned to the present assignee.

BACKGROUND OF THE INVENTION

The present invention relates to a data processing system including a high-speed buffer memory.

In conventional digital computers, an instruction to be executed next is read out from a memory (that is, a main memory or a buffer memory) in which macro instructions (hereinafter referred to as "instruction") and data are stored, and an address for specifying data to be used for the execution of this instruction is determined by an instruction unit. Based upon this data address, corresponding data is read out from the above-mentioned memory, and thus the instruction is executed. The data read out from the memory has a predetermined length, for example, a length of 8 bytes. Read-out of data from the memory is not performed on data of 8 bytes starting from a given address position, but read-out is performed on data having a length of 8 bytes from the boundary position between two blocks each including 8 bytes. Accordingly, when data to be read out is located on both sides of the boundary position, the read-out operation must be performed twice, even if the length of the desired data is less than 8 bytes. In more detail, 8 bytes having an address smaller than the boundary position and 8 bytes having an address larger than the boundary position are subjected to respective read-out operations. Positioning between these two groups of 8-byte data is performed using an arithmetic unit so that the desired 8-byte data can be picked up from the two groups of 8-byte data. In the case where the positioning between two groups of data and the pick-up of data are performed using an arithmetic unit, a long processing time is required. In order to eliminate such a defect, data processing systems which include a circuit used only for the positioning and picking-up of data (hereinafter referred to as a "data converter"), are proposed in U.S. Pat. No. 3,858,183 and Japanese Patent Application (Laid-open No. 94133/78). In the former data processing system, data of 8 bytes including desired data of 4 bytes is read out from a memory, positioning of the read-out 8-byte data is performed by a data converter, and the desired data of 4 bytes is then picked up. In the latter data processing system, positioning of data of 16 bytes including desired data of up to 8 bytes is performed using a data converter, and the desired data of up to 8 bytes is picked up. If positioning and picking-up of optional data are performed using a data converter, as described above, the instruction processing time can be shortened.

In many digital computers each including a high-speed buffer memory, however, the buffer memory stores therein at one time data of a predetermined length, for example, data of 64 bytes. When data to be read out is located on both sides of the boundary position between two groups of 64-byte data, the readout operation has to be performed twice, even if the above-mentioned data converter is employed. That is, 8 bytes having an address smaller than the boundary position and 8 bytes having an address larger than the boundary position are read out, respectively. Then, positioning between the two groups of 8-byte data has to be performed using the data converter so that the desired 8-byte data can be picked up from these two groups of 8-byte data.

SUMMARY OF THE INVENTION

A main object of the present invention is to provide a data processing system in which desired data located on both sides of a boundary position between two blocks can be read out at one time from a buffer memory storing therein various data in blocks.

In order to attain the above and other objects, according to the present invention, there is provided a data processing system in which it is detected whether or not data to be read out from a buffer memory is spread over two blocks (each of which is used as the unit for storing data in the buffer memory and is hereinafter assumed to include 64 bytes), and when the presence of a block cross is detected, addresses of two blocks including a desired operand are generated as addresses in first and second banks making up the buffer memory, whereby the desired operand is read out at one time from the adjacent blocks. According to the present invention, since the next block address can be generated in one cycle, the delay time is shortened as compared with the conventional data processing systems. Further, since processing with respect to the block cross can be performed as an internal operation of the memory means, interfaces between a block-cross unit and other units can be simplified.

BRIEF DESCRIPTION OF THE DRAWINGS

FIGS. 4 and 5 are diagrams for explaining the operation of the address modifying circuit shown in FIG. 3.

FIGS. 7 and 8 are diagrams for explaining the operation of the block-cross detecting circuit shown in FIG. 6.

FIG. 10 is a diagram for explaining the operation of various circuit elements employed in the embodiment shown in FIG. 1.

DESCRIPTION OF THE PREFERRED EMBODIMENT

Now, the present invention will be explained below in detail by reference to the illustrated embodiment.

The present embodiment is applicable to the electronic computer System/370 Model manufactured by International Business Machines Corporation, and the operation of this system is explained in a publication entitled "Principles of Operation of IBM System/370" published by the above company. Accordingly, explanation of the operation of this system will be omitted in the description given hereinafter unless particularly needed. Further, terms used in the above publication are used herein without explanation except in particular cases.

Figure 1:
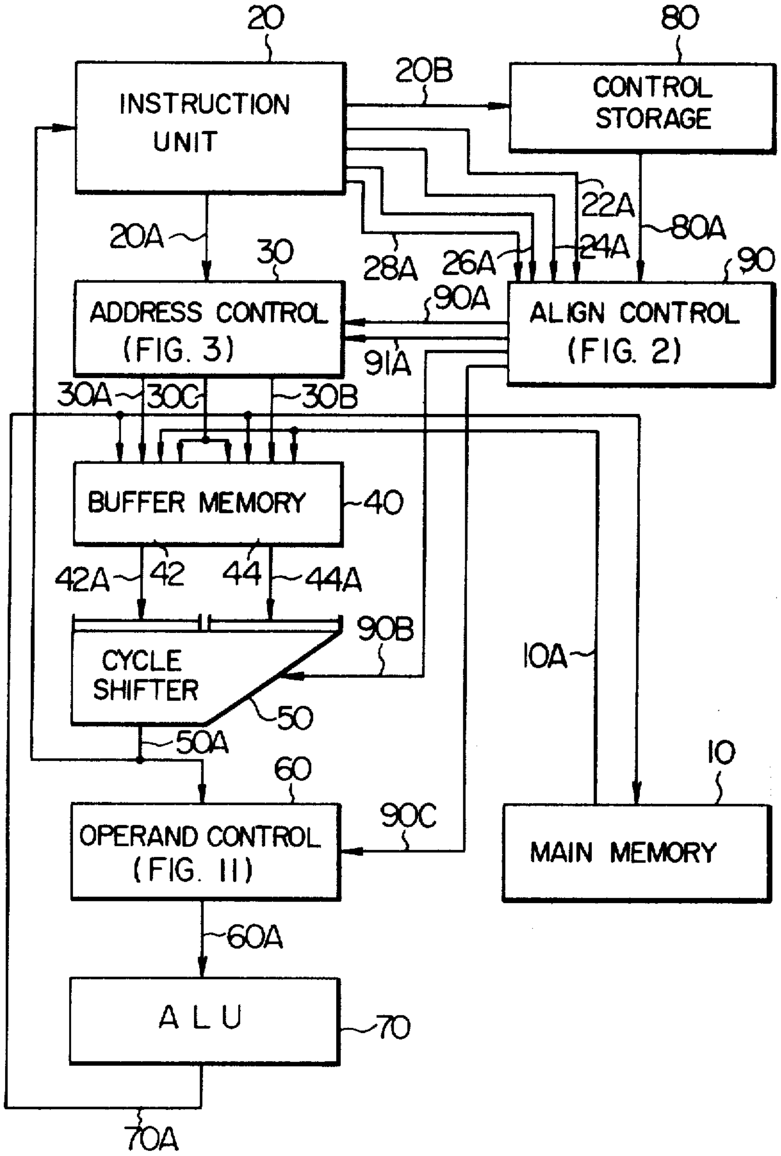
FIG. 1 is a block diagram showing a circuit configuration of an embodiment of a data processing system according to the present invention.
Figure 2:
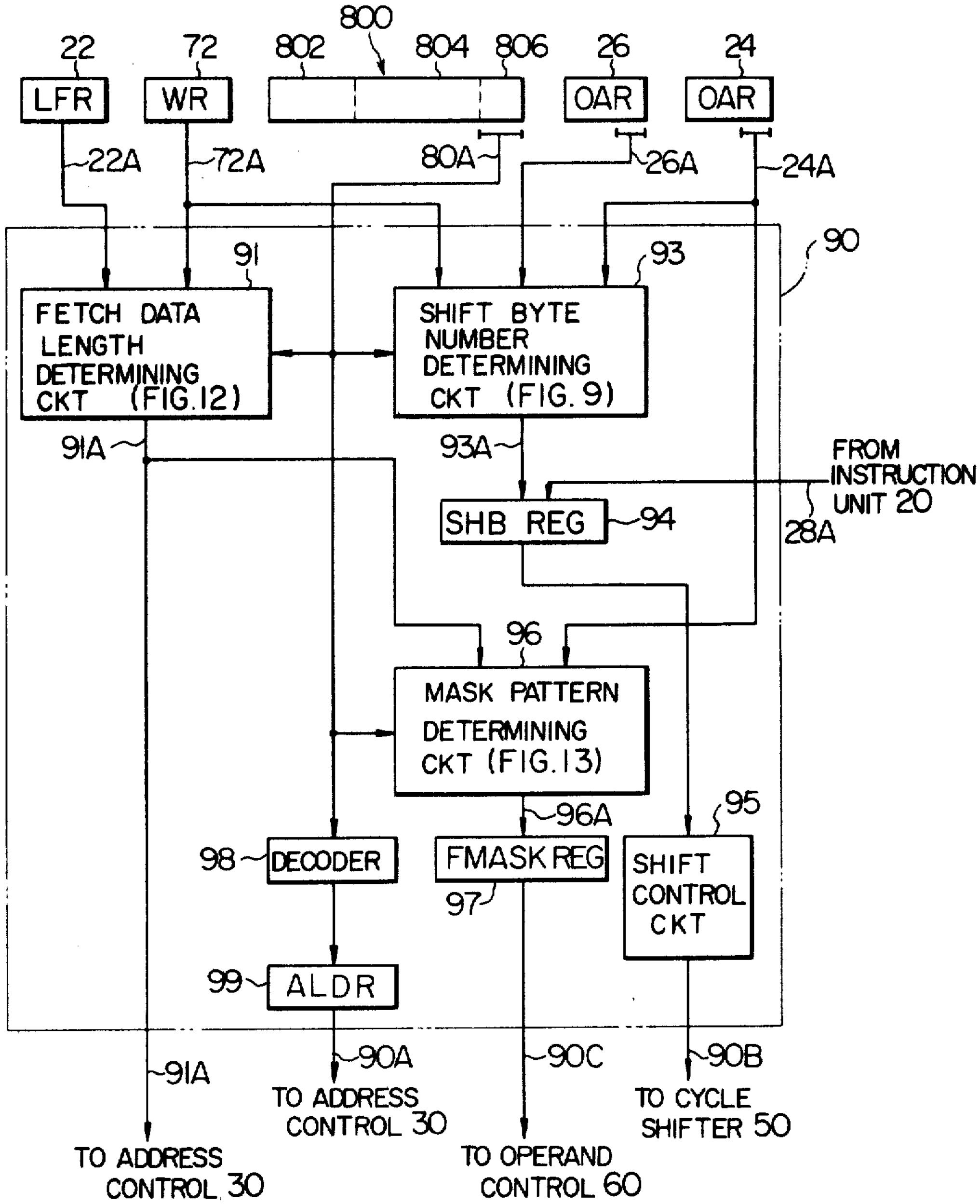
FIG. 2 is a block diagram for showing in detail the align control shown in FIG. 1 and related circuit elements.

Referring to FIG. 1, a plurality of instructions and a plurality of data are stored in a main memory 10 and a buffer memory 40. An instruction unit 20 sends a logical address of 32 bits for reading out an instruction to be executed from the buffer memory 40, to an address control 30 through a line 20A. In response to the logical address, the address control 30 sends a physical address of 32 bits to a line 30A or 30B, and the physical address is then supplied to the buffer memory 40. The buffer memory 40 is made up of first and second banks 42 and 44. In response to the physical addresses on the lines 30A and 30B, the first and second banks 42 and 44 both send out memory information each having a length of 8 bytes to lines 42A and 44A, respectively. When the instruction to be read out is stored in the first bank 42 of the buffer memory 40, a cycle shifter 50 of a 16-byte length does not perform any shifting operation, but the instruction outputted from the first bank 42 is sent to the instruction unit 20 through a line 50A. When the instruction to be read out is stored in the second bank 44, the cycle shifter 50 performs the shifting operation in such a manner that the instruction outputted from the second bank 44 is shifted to the left by a quantity corresponding to 8 bytes, to send the instruction to the instruction unit 20 through the line 50A. The quantity of shifting conducted by the cycle shifter 50 to read out the instruction is fed from the instruction unit 20 to an align control 90 through a line 28A. As shown in FIG. 2, the align control 90 stores the shifting quantity in a shift byte number register (SHB REG) 94, and a signal instructing a corresponding shifting operation is fed from a shift control circuit 95 to the cycle shifter 50 through a line 90B.

When a predetermined instruction is not stored in the buffer memory 40, the instruction is transferred from the main memory 10 to the buffer memory 40 through a line 10A, and then processed in the same manner as described above. All the addresses for access to the main memory 10 are supplied by output lines 30A to 30C of the address control 30, though address lines to the main memory 10 are omitted in FIG. 1 for brevity's sake.

The instruction unit 20 decodes whether or not the instruction to be executed next is an instruction for emitting both a read-out request and a write-in request to the main memory (hereinafter referred to as an "instruction SS"). For example, an instruction such as an AND CHARACTER instruction, an OR CHARACTER instruction, an EXCLUSIVE-OR CHARACTER instruction, or a decimal arithmetic instruction reads out first and second data from first and second addresses of the main memory 10, performs a predetermined operation, and then stores the results of the operation in the first address of the main-memory 10. Further, an MOVE CHARACTER (MVC) instruction reads out data from a first address of the main memory 10 and stores the data in a second address of the main memory 10.

When it is confirmed from the results of decoding that the instruction to be executed next is an instruction SS, a starting logical address of data to be read out (hereinafter referred to as a "second operand logical address") and a starting logical address of data to be stored (hereinafter referred to as a "first operand logical address") are determined by the instruction unit 20 on the basis of address information in the instruction. Further, the instruction unit 20 determines an entire length LF of these two items of data based upon the length information included in the instruction. Each of these addresses includes 32 bits, and the entire length LF information includes 8 bits within the address. The first and second operand logical addresses and the data length LF are stored in first and second operand address registers (OAR) 24 and 26 (see FIG. 2) and a length field register (LFR) 22 (see FIG. 2), respectively. Incidentally, the entire length LF of data has a value which is one byte shorter than the actual data length, and therefore a one-byte shorter length data value is stored in LFR 22.

The above-mentioned starting address of data indicates either a smaller value (hereinafter referred to as a "leftmost address") designating the address of the leftmost storage location for the data or a larger value (hereinafter referred to as a "rightmost address") designating the address of the rightmost storage location for the data of those addresses which are used to specify the data storage locations for the 8 bytes. It depends upon the instruction whether the leftmost or the rightmost address is used as the starting address. For example, for a decimal arithmetic instruction, the starting address is the rightmost address, and for other instructions SS, the starting address is the leftmost address.

The second operand logical address is first supplied from the instruction unit 20 to the address control 30 through the line 20A, and the lower 4 bits of the first and second operand logical addresses and the entire length LF of data are fed from the instruction unit 20 to the align control 90 through lines 24A, 26A and 22A, respectively. On the other hand, the instruction unit 20 sends out the operation code (OP code) in the instruction to a control storage 80 through a line 20B. The control storage 80 successively reads out microinstructions in a microinstruction sequence specified by the OP code, to control the execution of the instruction. When the control storage 80 reads out a microinstruction, the microinstruction is stored in a control register (CR) 800 (see FIG. 2) provided in the control storage 80. Each microinstruction comprises a next address field 802 for specifying a microinstruction to be read out next, a control field 804 for indicating control information necessary for the execution of the instruction, and an align field 806 of 4 bits for controlling the positioning and pick-up of read-out data. The align control 90 receives the control information in the align field 806 through a line 80A, and sends control signals to the address control 30, cycle shifter 50 and operand control 60 through lines 90A, 90B and 90C, respectively.

As shown in FIG. 2, the control information in the align field 806 is decoded by a decoder 98 in the align control 90, to judge whether the operand addresses stored in the operand address registers (OAR) 24 and 26 are the leftmost address or the rightmost address. Since it is already determined depending upon the kind of the instruction whether the operand address stored in OAR's 24 and 26 are the leftmost address or not, the above judgement can be formed, if the contents of the align field 806 are previously made to correspond to the kind of instruction. For example, in the case where the addresses stored in OAR's 24 and 26 indicate the rightmost address as in decimal arithmetic instructions, the decoder 98 outputs "1", and in other cases than the above, the decoder 98 outputs "0". The output of the decoder 98 is stored in an align direction register (ALDR) 99. The output of ALDR 99 is sent to the address control 30 through the line 90A (see FIG. 1).

Figure 3:
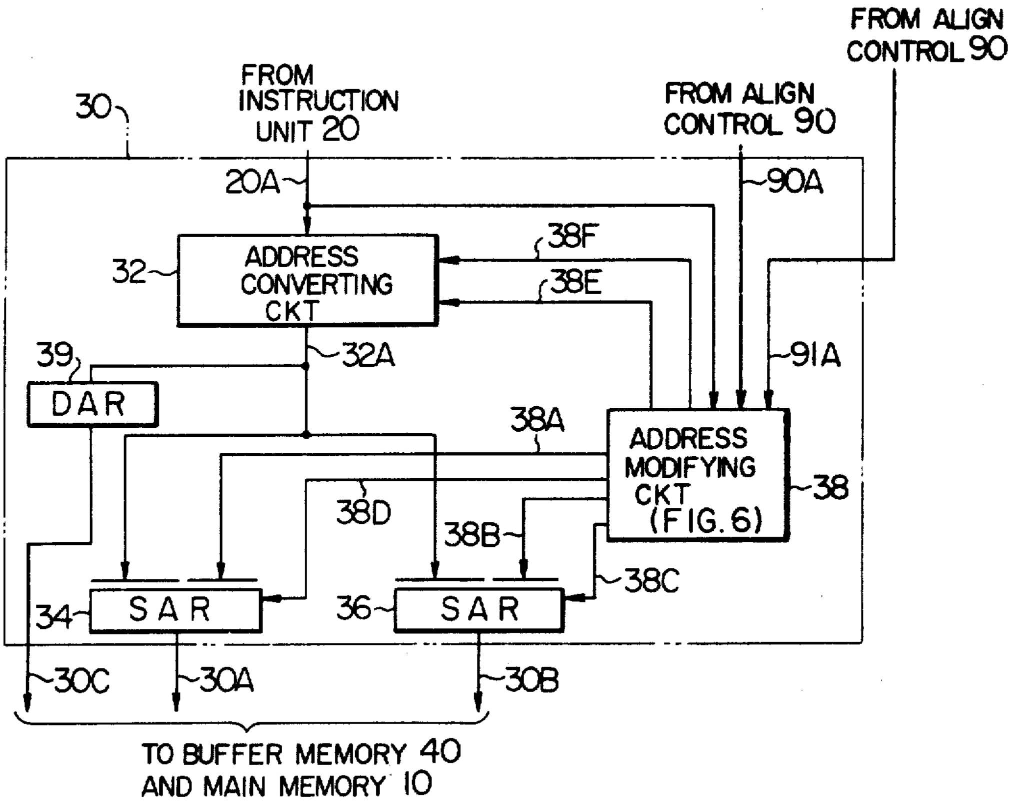
FIG. 3 is a block diagram for showing in detail the address control shown in FIG. 1.
Figure 4:
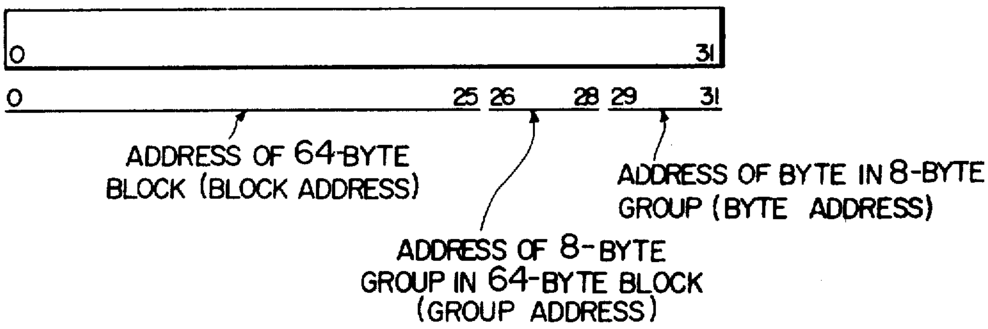

A detailed circuit configuration of the address control 30 is shown in FIG. 3. The second operand logical address of 32 bits is supplied from the instruction unit 20 to an address converting circuit 32 having a known circuit arrangement through the line 20A, to be converted into a corresponding second operand physical address of 32 bits. Bits 0 to 25 of the second operand physical address shown in FIG. 4, that is, a block address is applied to bit positions 0 to 25 of each of the source address registers (SARs) 34 and 36 through a line 32A. On the other hand, bits 26 to 28 of the second operand logical address are applied to an address modifying circuit 38 through the line 20A. The bits 26 to 28 of the address indicate an address of a group of 8 bytes included in a block of 64 bytes, as shown in FIG. 4. In response to the signal on the line 90A designating whether the address is a leftmost or rightmost address given by the align control 90 and the signal on the line 20A given by the instruction unit 20, the address modifying circuit 38 sends binary data of 3 bits to each of lines 38A and 38B in accordance with the relationship shown in FIG. 5.

Figure 6:
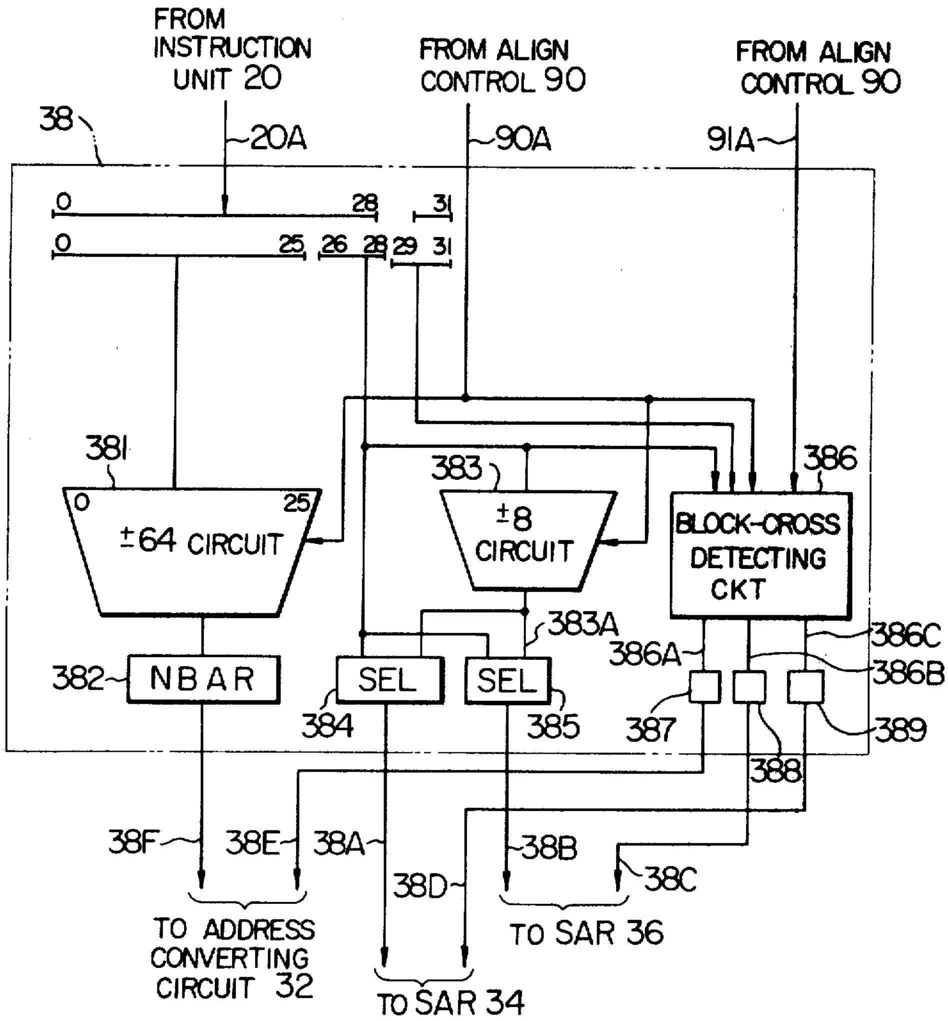
FIG. 6 is a block diagram for showing in detail the address modifying circuit shown in FIG. 3.

A detailed circuit configuration of the address modifying circuit 38 is shown in FIG. 6. Referring to FIG. 6, bits 0 to 25 of the second operand logical address are applied to a ±64 circuit 381 through the line 20A, and a digit "1" is added to or subtracted from the second operand logical address at the bit position 25 thereof to index that address to the next block or the previous block, depending on whether the output line 90A of ALDR 99 is kept at the level "0" or the level "1". The results of the above operation are stored in next block address register (NBAR) 382. In other words, when the second operand logical address on the line 20A indicates the rightmost address, the logical address is decreased by 64 bytes, and when the logical address indicates the leftmost address, the logical address is increased by 64 bytes. Thus, a logical address of the previous or next adjacent block is obtained. A ±8 circuit 383 adds a digit "1" to or subtracts a digit "1" from bits 26 to 28 of the second operand logical address on the line 20A at the bit position 28 of this address to index the address to the next group or the previous group depending on whether the output line 90A of ALDR 99 is kept in the level "0" or the level of "1". An output signal on an output line 383A of the ±8 circuit 383 and the bits 26 to 28 of the second operand logical address on the line 20A are applied to selectors (SEL) 384 and 385. Since the selectors 384 and 385 perform a selecting operation in accordance with the relation shown in FIG. 5, explanation of the selecting operation is omitted. Thus, an output signal on an output line 38A of the selector 384 specifies an address in the first bank 42 of the buffer memory 40, and an output signal on an output line 38B of the selector 385 specifies an address in the second bank 44.

A block-cross detecting circuit 386 judges whether or not a desired operand is spread over two blocks each including 64 bytes, on the basis of bits 26 to 31 of the second operand logical address supplied from the instruction unit 20, a fetch data length on a line 91A and the output of ALDR 99 on the line 90A. The relation shown in FIG. 7 is employed in the above judgement. In more detail, when the combinations shown in FIG. 7 are realized, the desired operand is spread over two blocks, and a line 386A is kept at the level "1". Thus, a flip-flop 387 is set, an output line 38E of the flip-flop 387 is brought to the level of "1", and the input of the address converting circuit 32 is changed over from the line 20A to an output line 38F of NBAR 382. At this time, the logical address of the next or the previous block has been already determined on the line 38F. Accordingly, the physical address of the next or the previous block appears on the output line 32A of the address converting circuit 32. Further, in the case where the line 386A is kept at the level "1", an output line 386B or 386C of the block-cross detecting circuit 386 is brought to the level "1" depending on whether the signal on the line 90A takes the level of "0" or the level of "1". Accordingly, a flip-flop 388 or a flip-flop 389 is set. When the flip-flop 388 is set, an output line 38C is brought to the level "1" and all bits of SAR 36 are thereby maintained as they are. At this time, an output line 38D of the flip-flop 389 is kept in the level of "0". Therefore, the contents of SAR 34 are not maintained but the physical address of the previous block on the line 32A is set in SAR 34. At this time, however, bits 26 to 28 of SAR 34 hold a previous value. With the above operation, a physical address of one block including a desired operand is set in SAR 36, and a physical address of the other block including the operand is set in SAR 34. On the other hand, when the flip-flop 389 is set, the output line 38D is brought to the level of "1" and all bits of SAR 34 are thereby maintained as they are. At this time, the output line 38C of the flip-flop 388 is kept in the level "0". Therefore, the contents of SAR 36 are not maintained but the physical address of the next block on the line 32A is set in SAR 36. At this time, however, bits 26 to 28 of SAR 36 hold a previous value. Thus, a physical address of one block including a desired operand is set in SAR 34, and a physical address of the other block including the operand is set in SAR 36.

The operation of the address modifying circuit 38 has the following significance.

Figure 8:
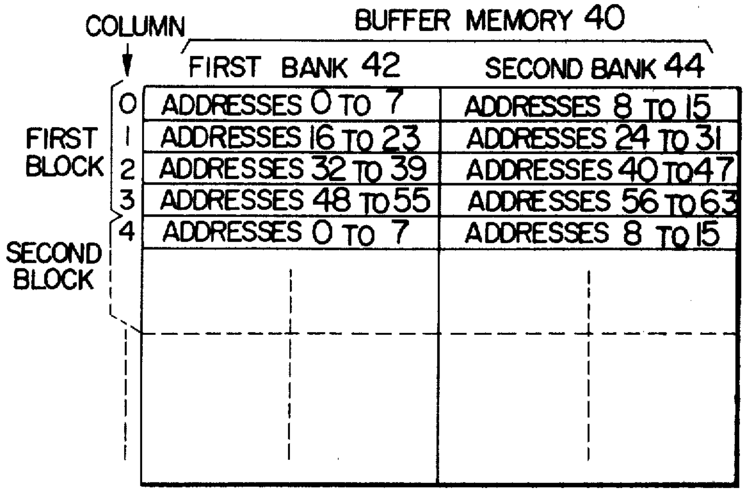

The first and second banks 42 and 44 of the buffer memory 40 are addressed alternately in units of 8 bytes. In more detail, as shown in FIG. 8, when addresses have such values as 0 to 7, 16 to 23, and 32 to 39 in decimal notation, data corresponding to these addresses is stored in the first bank 42, and when addresses have such values as 8 to 15, 24 to 31, and 40 to 47 in decimal notation, data corresponding to these addresses is stored in the second bank 44. For example, in the case where the address indicating the left end of data is 4 (address bits 26–31 are 000011) and the operand length is 7, an address indicating the first bank 42, the first block and the zero-th column is stored in SAR 34, and simultaneously an address indicating the second bank 44, the first block and the zero-th column is stored in SAR 36, as seen from FIG. 5. Accordingly, data having the addresses 0 to 7 and 8 to 15 are read out from the buffer memory 40. Then, data having addresses 4 to 11 are picked up by the cycle shifter 50. Further, in the case where the the address indicating the left end of data is 12 (address bits 26–31 are 001100) and the operand length is 7, an address indicating the first bank 42, the first block and the first column is stored in SAR 34, and simultaneously an address indicating the second bank 44, the first block and the zero-th column is stored in SAR 36, as seen from FIG. 5. Accordingly, data having addresses 8 to 15 and 16 to 23 are read out from the buffer memory 40, and data having addresses 12 to 19 are picked up by the cycle shifter 50. Furthermore, in the case where the address indicating the left end of data is 60 and the operand length is 7, the block cross is detected, and an address indicating the second bank 44, the first block and the third column is stored in SAR 36. In the next cycle, an address indicating the first bank 42, the second block and the fourth column is stored in SAR 34. Accordingly, data having addresses 56 to 63 in the first block and data having addresses 0 to 5 in the second block is read out from the buffer memory 40, and data having addresses 60 to 63 in the first block and addresses 0 to 3 in the second block are picked up by the cycle shifter 50.

Setting of addresses in SAR's 34 and 36, read-out of data from the buffer memory 40 and the shifting operation by the cycle shifter 50 in the case where the address indicates the right end of data, can be readily understood from the above description. Accordingly, further explanation of such a case is omitted.

As described above, in SAR's 34 and 36 are stored addresses for reading out two 8-byte data items, which form continuous data of 16 bytes, from the first and second banks 42 and 44 of the buffer memory 40. When data is included in one block, the data is read out by a single read-out operation. Even in the case where data is spread over two blocks, the data can be read out by a single read-out operation, though the read-out of data is delayed by one cycle for the detection of a block cross. However, in the case where the next block address can be formed in a time necessary for subjecting the logical address outputted from the instruction unit to address conversion and for storing the converted addresses in SAR's 34 and 36, the above-mentioned delay can be prevented.

When desired data is not stored in the buffer memory 40, the data is transferred from the main memory 10 to the buffer memory 40, and then the above-mentioned read-out operation is performed. The read-out data of 16 bytes is sent to the cycle shifter 50 through the lines 42A and 44A. The cycle shifter 50 cycle-shifts the input data to the left by a byte number, which is determined by a shift control signal supplied through a line 90B from the align control 90. The shift control signal is given by a shift control circuit 95 shown in FIG. 2. The circuit 95 receives the output of a shift byte number determining circuit 93 through a shift byte number register (SHB REG) 94, and outputs a corresponding shift control signal. The shift byte number determining circuit 93 receives lower 4 bits of the first and second operand addresses stored in OAR's 24 and 26 (which are provided in the instruction unit) through the lines 24A and 26A, respectively, and also receives data in a work register (WR) 72 (see FIG. 2) which is provided in an arithmetic unit (ALU) 70 (see FIG. 1). Based on this data, the circuit 93 determines the shift byte number under the control of the contents of the align field 806 which are given through the line 80A. The shift byte number thus determined is stored in SHB REG 94.

Figure 9:
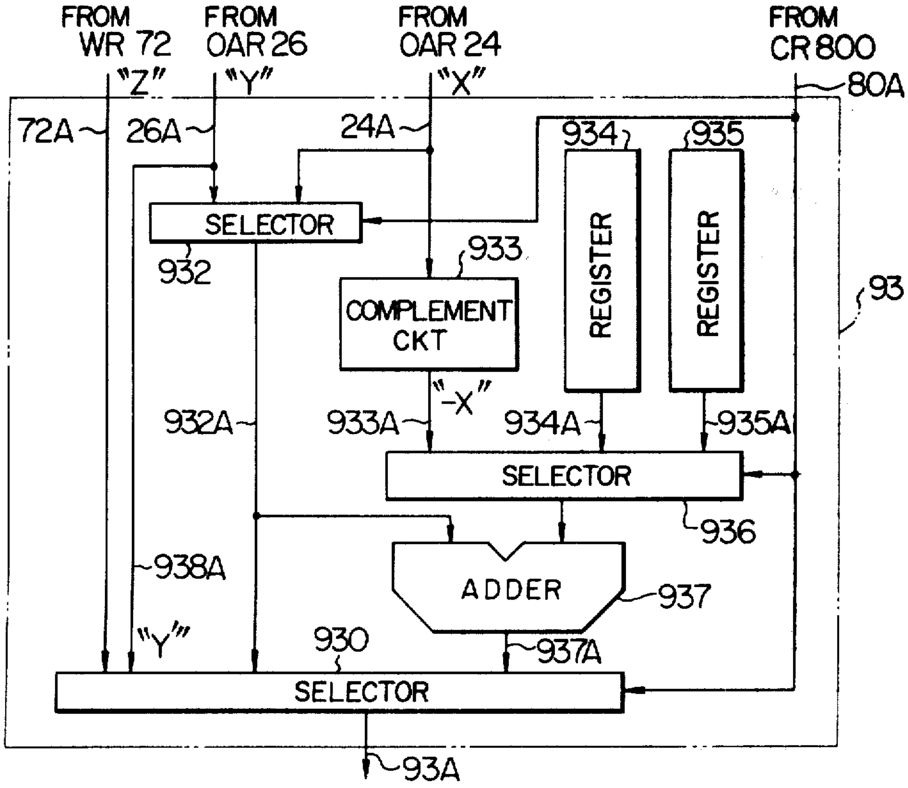
FIG. 9 is a block diagram for showing in detail the shift-byte-number determining circuit shown in FIG. 2.

A detailed circuit configuration of the shift byte number determining circuit 93 is shown in FIG. 9. Referring to FIG. 9, the circuit 93 includes selectors 932, 936 and 930, a complement circuit 933, registers 934 and 935, and an adder 937. The complement circuit 933 outputs a two's complement of data "X" formed by lower 4 bits of OAR 24, that is, data "−X" when viewed from the mathematical standpoint. The registers 934 and 935 store therein binary data corresponding to constants "9" and "13", respectively. The selector 932 selects the data "X" of lower 4 bits of OAR 24 or data "Y" of lower 4 bits of OAR 26. The selector 936 selects one of the outputs of the complement circuit 933 and registers 934 and 935. The adder 937 finds the sum of the outputs of the selectors 932 and 936. The selector 930 selects one of the output "Z" of WR 72, data "Y′" on a line 938A which is obtained by making all of the lower 3 bits of the data "Y" on the line 26A equal to "0", the output of the selector 932 and the output of the adder 937. The operations of these selectors 932, 936 and 930 are controlled by data in the align field 806, which is sent from CR 800 through the line 80A. The relation of the selecting operations of these selectors to the data in the align field 806 is shown in FIG. 10. Incidentally, examples of instructions corresponding to the data in the align field are also shown in FIG. 10. Referring to FIG. 10, when the output of the decoder 98 (see FIG. 2) is "0", the data outputted from the selector 930 corresponds to one of "X", "Y", "Y′", "Z", "Y−X" and "Y+13", and when the output of the decoder 98 is "1", the data outputted from the selector 930 corresponds to "Y+9" or "X+9". Accordingly, on processing a certain instruction, the data of the align field in the microinstruction sequence for controlling the execution of the instruction may be specified according to FIG. 10 so that the number of bytes desirable for shifting can be outputted from the selector 930. The align data, however, should be determined after the selecting operation of a selector 960, which will be described later, has been specified. Referring to FIG. 9, when the data "Z" of WR 72 is selected, shifting of a given number of bytes can be conducted by determining the value of the data "Z" according to need.

Figure 11:
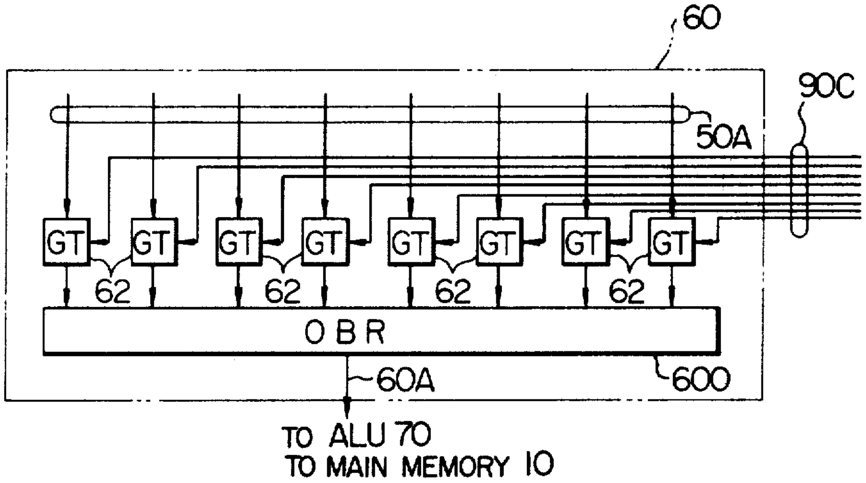
FIG. 11 is a block diagram for showing in detail the operand control shown in FIG. 1.

Referring back to FIG. 1, the cycle shifter 50 cycle-shifts the input data to the left by a byte number under the control of the align control 90, picks the upper 8 bytes of the shifted data, and sends the picked-up data to the operand control 60 through the line 50A. As shown in FIG. 11, the operand control 60 cuts data having certain byte positions from the data inputted through the line 50A by gates 62, in response to fetch mask data of 8 bits fed from the align control 90 through the line 90C. The data thus processed is stored in an operand buffer register (OBR) 600, and then sent to ALU 70 through the line 60A. The fetch mask data, as shown in FIG. 2, is supplied from a mask pattern determining circuit 96 through a line 96A and a fetch mask register (FMASK REG) 97. The circuit 96 responds to the output of a fetch data length determining circuit 91 for determining the length of data to be read out and to the lower 4 bits in OAR 24, and outputs a fetch mask pattern under the control of the data of the align field 806, which is supplied from CR 800 through the line 80A. The fetch data length determining circuit 91 responds to the output of LFR 22 in the instruction unit 20 and the output of WR 72 in ALU 70, and determines the fetch data length under the control of the data of the align field 806.

Figure 12:
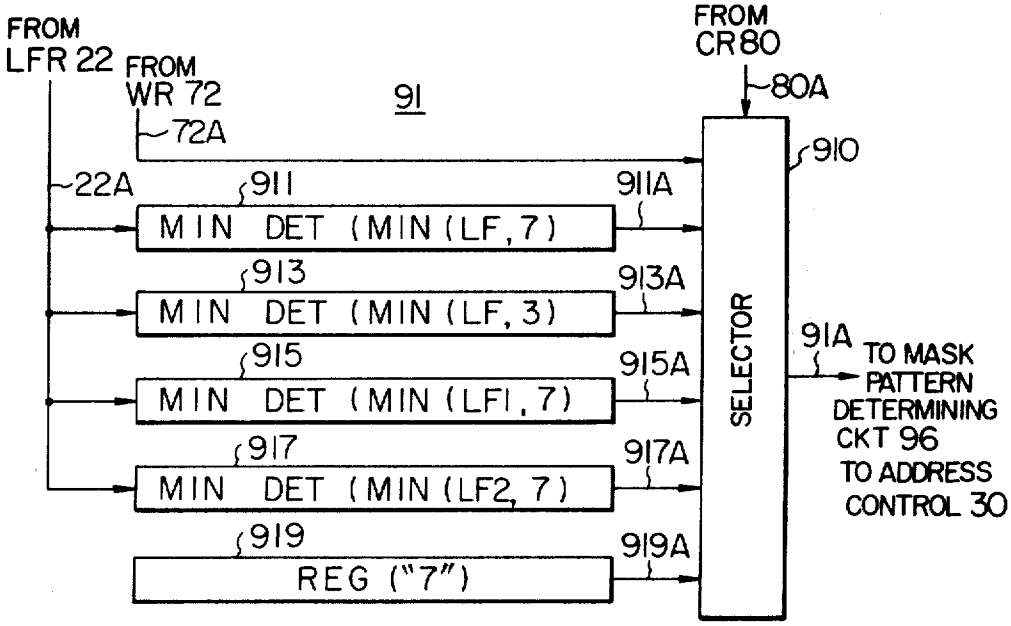
FIG. 12 is a block diagram for showing in detail the fetch-data-length determining circuit shown in FIG. 2.

A detailed circuit configuration of the fetch data length determining circuit 91 is shown in FIG. 12. Referring to FIG. 12, the circuit 91 includes minimum value detecting circuits (MIN DET) 911, 913, 915 and 917, a constant register 919, and a selector 910 for selecting one of the outputs of these circuit elements 911, 913, 915, 917 and 919 and the output on the line 72A from WR 72. The selector 910 is controlled by the data of the align field 806, which is supplied from CR 800 through the line 80A. The relation of the data of the align field 806 to the output of the selector 910 is shown in FIG. 10. The circuits 911, 913, 915 and 917 are connected to LFR 22 in the instruction unit 20. The circuits 911 and 913 compare the entire length (of data) LF stored in LFR 22 with "7" and "3", respectively, and output a smaller value. The circuit 915 compares data LF1 represented by upper 4 bits of the data length LF with "7", and outputs a smaller value. The circuit 917 compares data LF2 formed by lower 4 bits of the data length LF with "7", and outputs a smaller value. The circuit 911 is selected by the selector 910 when the length of data read out from the buffer memory 40 is restricted to 8 bytes or less, for example, when an MVC instruction is executed. The circuit 913 is selected when the length of data read out from the buffer memory 40 should be 4 bytes or less. In the present embodiment, the circuit 913 is selected when an instruction requiring overlap processing is executed. The circuits 915 and 917 are selected when a decimal arithmetic instruction is executed, and they are used to read out the first and second operands, respectively. The constant register 919 is selected, for example, when the interruption processing is conducted, and is used to read out data of 8 bytes irrespective of the contents of LFR 22. The line 72A is selected when the length of read-out data is determined by a given value in WR 72.

Figures 13, 14:
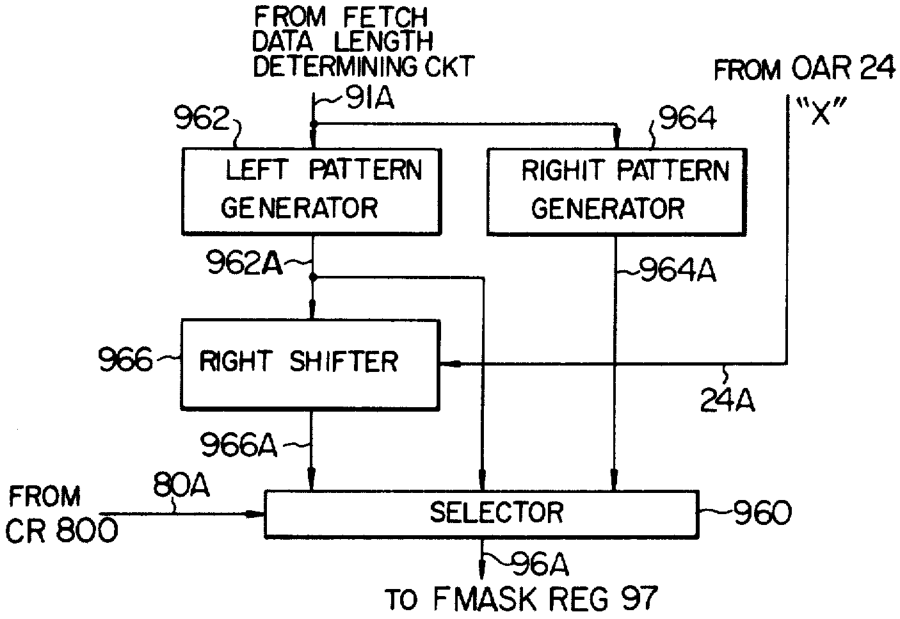
FIG. 13 is a block diagram for showing in detail the mask-pattern determining circuit shown in FIG. 2.
FIG. 14 is a diagram for showing mask patterns generated by the left and right pattern generators shown in FIG. 13.

A detailed circuit configuration of the mask pattern determining circuit 96 is shown in FIG. 13. Referring to FIG. 13, the circuit 96 includes left and right pattern generators 962 and 964 applied through the line 91A with the output of the fetch data length determining circuit 91, a right shifter 966 for shifting the output of the left pattern generator 962 to the right by a value, which is represented by the lower 4 bits in OAR 24 and supplied through the line 24A, and a selector 960 for selecting one of the outputs of the pattern generators 962 and 964 and right shifter 966. The selector 960 is controlled by the contents of the align field 806 which are supplied from CR 800. The pattern generators 962 and 964, as shown in FIG. 14, output data of 8 bits having a predetermined number of "1's" on the left and right sides, respectively, and the predetermined number is obtained by adding "1" to the fetch data length outputted from the fetch data length determining circuit 91.

The output of the selector 960 is sent through the line 96A to the FMASK REG 97 (see FIG. 2), and stored therein. The output of FMASK REG 97 is sent through the line 90C to eight gates 62 in the operand control 60 shown in FIG. 11. Gates corresponding to bits of "0" in the output of the selector 960 are brought to the "OFF" state, and all bits of one byte applied to each of these gates are made equal to "0". While, gates corresponding to bits of "1" in the output of the selector 960 assume the "ON" state, and therefore one byte applied to each of these gates is allowed to pass therethrough. Thus, in OBR 600, the data of desired byte positions is significant and the remaining data is "0". The data thus stored in OBR 600 is sent to ALU 70 through the line 60A.

When the entire length LF of data to be read out is equal to or less than 7 bytes, the data indicated by the first operand physical address can be read out by one read-out operation as described above. However, when the entire length LF exceeds 7 bytes, the above-mentioned operation is repeated until the data having an entire length LF is completely read out. In other words, the instruction unit 20 subtracts the length of read-out data from the value in LFR 22. When the resulting contents of LFR 22 are not negative, read-out of data is conducted again using the contents of LFR 22 and the contents of OAR 26, and is repeated until the contents of LFR 22 are negative.

In a period when the above-mentioned data is read out from the buffer memory 40, the instruction unit 20 sends the first operand logical address stored in OAR 24 (see FIG. 2), to the address control 30. The address control 30 generates a physical address of the first operand in the same manner as described hereinbefore. In the case where the instruction being executed requires that the data corresponding to the first operand physical address should be read out from the buffer memory 30, the read-out operation is conducted in accordance with the same procedure as described hereinbefore. In the address control 30 shown in FIG. 3, the first operand physical address is stored in a destination address register (DAR) 39. Then, a desired operation is conducted on this data in ALU 70, and the result of the operation is stored in the main memory 10 and buffer memory 40 at the first operand physical address positions.

When the instruction being executed does not require the read-out of data corresponding to the first operand address, as in an MVC instruction, data which is read out using the second operand physical address, is allowed to pass through ALU 70, and is sent to the main memory 10 and buffer memory 40 through line 70A to be stored in the memories 10 and 40 at the first operand physical address positions.

In either case, the stored address is supplied from DAR 39 in the address control 30 to one of the first and second banks 42 and 44 through the line 30C. In more detail, the stored address is selectively supplied to the first or second bank 42 or 44 accordingly as the fourth bit (from the least significant bit) of the stored address is "0" or "1". A gate circuit for controlling the above selective operation is omitted in the drawings for brevity's sake.

For better understanding of the above-mentioned embodiment, a specific example will be explained below.

An MVC instruction is processed in the example. Data "X" and "Y" represented by lower 4 bits of the first and second operand addresses are "2" and "6", respectively, in decimal notation, and the entire length LF of data is "8" in decimal notation. Since the entire length LF is represented by a numerical value which is one byte smaller than the actual data length, the actual length of data to be read out is 9 bytes.

The OP code of the MVC instruction is sent from the instruction unit 20 to the control storage 80, the initial microinstruction of the microinstruction sequence for executing the instruction is read out on CR 800, and then microinstructions in the sequence are successively read out in a predetermined order to execute the instruction. The instruction unit 20 judges whether or not the word overlap processing is necessary for the execution of the instruction, and the result of the judgement is transferred to the control storage 80. The control storage 80 directs the microinstructions to different branches in accordance with the above result.

In the case where it is judged that the MVC instruction does not require the overlap processing, data "0101" is stored in the align field 806 of the subsequent microinstruction branch. The data in the align field is decoded by the decoder 98 when desired data is read out from the memory 10. The result of decoding, which is "0" as shown in FIG. 10, is sent to the address control 30 through the line 90A. The address control 30 generates a second operand physical address on the basis of the above result and a second operand logical address from OAR 26. Thus, data of 16 bytes including data of 8 bytes whose leftmost address is given by the second operand physical address, is read out from the buffer memory.

In the shift byte number determining circuit 93 in the align control 90, the selector 930 outputs data "Y−X", that is, the difference between the first and second logical addresses, in response to the align data "0101". In the present example, the difference is "4". The output "4" is stored in SHB REG 94 and then sent to the shift control circuit 95. The data of 16 bytes read out from the buffer memory 40 is cycle-shifted by the cycle shifter 50 to the left by a quantity corresponding to 4 bytes, under the control of the shift control circuit 95. Accordingly, a part of the data indicated by the second operand address is included in the data outputted from the cycle-shifter 50 in a region from the 3rd byte from the left to the 8th byte from the left, that is, in a 6-byte region. The left two bytes in the data outputted from the cycle shifter 50 are data unnecessary for executing the present instruction.

In the fetch data length determining circuit 91 in the align control 90, the selector 910 selects the output line 911A of MIN DET 911 in response to the align data "0101", as shown in FIG. 10. Since the circuit 911 is applied with "8" from LFR 22, the output of MIN DET 911 is "7". This output is fed to the pattern generators 962 and 964 in the mask pattern determining circuit 96. The selector 960 in the circuit 96 selects the output line 966A of the right shifter 966 in response to the align data "0101", as shown in FIG. 10. The left pattern generator 962 outputs a pattern "11111111" in response to the input data "7" (that is, "111" in decimal notation), as shown in FIG. 14. The right shifter 966 shifts the pattern to the right by a numerical value (2 in the present example) of the data represented by the lower 4 bits of the first operand logical address, which is supplied from OAR 24.

The operand control 60 cuts the first and second bytes of the 8-byte output from the cycle shifter 50 in response to the above-mentioned 8-bit pattern from the align control 90, and stores data of the remaining 6 bytes in OBR 600. Thus, data of 8 bytes, which includes data of 6 bytes beginning from the second operand address and other data of "0", is stored in OBR 600. Then, the instruction unit 20 reduces the LF value in LFR 22 from "8" to "2", which is obtained by subtracting the byte number "6" of the above-mentioned 6-byte data from "8", and increases the value in each of OAR's 24 and 26 by "6". Read-out of data is carried out in the same manner as described above, using the renewed contents of LFR and OAR's. When the FL value in LFR 22 becomes negative, the MVC instruction terminates.

MVC instructions requiring no overlap processing are processed according to the above-mentioned procedures.

Now, let us consider the case where an MVC instruction requires the overlap processing. In this case, data "0001" is stored in the align field 806 in the subsequent microinstruction branch. The selector 910 (see FIG. 12) selects the output of the circuit 913, and delivers the output as the length of read-out data. The selector 930 (see FIG. 9) in the shift byte number determining circuit 93 outputs data "Y'". The shift control circuit 95 controls the cycle shifter 50 so that the output of the buffer memory 40 is outputted from the cycle shifter 50 without being subjected to shifting or after being shifted by 8 bytes depending on whether "Y" is "0000" or "1000". Other operations are, in principle, similar to those in the case where the overlap processing is not required. Accordingly, explanation of these operations is omitted.

Next, explanation will be made on the operation of the present invention in the case where a decimal arithmetic instruction is processed.

In this case, in the microinstruction sequence for reading out data represented by the second operand address, data "1110" is stored in the align field. Accordingly, the selector 910 selects the line 917A. Since LF2 in the present example is "8", binary data corresponding to "7" is sent from the circuit 917 to the line 917A. Accordingly, the second operand having a length of 8 bytes from the second operand address is read out from the buffer memory 40. This second operand is cycle-shifted by the cycle shifter 50 to the left by a quantity corresponding to data "Y+9". The data "Y+9" is outputted from the selector 930 in the shift byte number determining circuit 93 shown in FIG. 9. The data "Y+9", which is applied to the cycle shifter 50, is necessary and sufficient for picking up data of 8 bytes having the second operand address as the rightmost address among data of 16 bytes outputted from the buffer memory 40. The above-mentioned data of 8 bytes is fed to the operand control 60. The operand control 60 is controlled by the align control 90. In the mask pattern determining circuit 96 in the align control 90, the selector 960 (see FIG. 13) selects and outputs the output of the right pattern generator 964. Accordingly, in the operand control 60, data including significant data having the same byte number as the fetch data length outputted from the selector 910 (see FIG. 12) and other data of "0" are formed from the data of 8 bytes having the second operand address as the rightmost address. The data thus formed is sent to ALU 70. Then, the first operand address is sent from the instruction unit 20 to the address control 30. The first operand physical address is generated and read-out of data is performed, in the same manner as the second operand. In this case, the first operand physical address is stored also in DAR 39 (see FIG. 3). Data "1101" is stored in the align field in the microinstruction sequence for processing the first operand. Accordingly, the selector 930 (see FIG. 9) outputs data "X+9", and the cycle shifter 50 and output control 60 are controlled by the align control 90 in a manner similar to the second operand. The first operand thus read out and the second operand read out previously are subjected to a predetermined operation in ALU 70, and the result of the operation is stored in the buffer memory 40 and main memory 10. The address for storing the result is supplied from DAR 39 in the address control 30. Thus, processing of a decimal arithmetic instruction is completed.

As is apparent from the foregoing explanation, according to the present invention, there is provided a very simple data processing system in which positioning and pick-up of data necessary for processing of various instructions can be performed through the known microinstruction control technique. Needless to say, the present invention is not limited to the above-mentioned embodiment, but includes various modifications that can be readily made by those skilled in the art without departing from the scope defined by claims given hereinafter. For example, according to one of the modifications, there is provided a data processing system in which a circuit for controlling the positioning and pick-up of data without employing microinstructions is provided in the instruction unit, and the output of the align control 90 shown in FIG. 1 and the output of the above control circuit are changed over to each other to supply one of the outputs to the address control 30, cycle shifter 50 and operand control 60, whereby the circuits for conducting the positioning and pick-up of data can be controlled either by microinstructions or by the control circuit.

We claim:

1. In a data processing system including memory means having a plurality of memory banks for storing a plurality of instructions and data in blocks each having a predetermined length, the improvement comprising:

instruction means for indicating an address of data and a length indication of said data relating to execution of an instruction;

data length determining means responsive to said length indication from said instruction means for determining the length of data to be fetched from said memory means;

block-cross detecting means responsive to said address from said instruction means and said length of data information from said length determining means for detecting whether or not said data to be fetched from said memory means with a single access is spread over a plurality of blocks; and address means for supplying an address for fetching data to each of said plurality of memory banks of said buffer memory means with a single access on the basis of said address from said instruction means, said address means including means for supplying to one of said banks an address of a block adjacent to a block indicated by said address from said instruction means in response to the detection of a block cross by said detecting means.

2. A data processing system according to claim 1, wherein said address for fetching data comprises a part for indicating an address of a block and a part for indicating the address of a memory location within said block, and wherein said address means includes a plurality of address registers each for storing therein said address to be supplied to one of said banks, block address generating means for supplying a block address to said address registers on the basis of said address from said instruction means, and address-in-block generating means for supplying an address-in-block to said address registers on the basis of said address from said instruction means.

3. A data processing system according to claim 2 wherein said block address generating means includes means for storing the same block address in all of said address registers in the absence of a block cross detected by said block-cross detecting means.

4. A data processing system according to claim 2, wherein said block address generating means includes next block address generating means for generating an address of a block adjacent to a block indicated by said address from said instruction means, and means for applying a block address from said next block address generating means to one of said address registers which is determined by an address-in-block indicated by said address from said instruction means, when the presence of block cross is detected by said block-cross detecting means.

5. A data processing system according to claim 2, wherein said block address generating means includes means for applying an address of a block indicated by said address from said instruction means and an address of block adjacent to said block in respective address registers to read out data having continuous addresses from said plurality of memory banks of said memory means, when the presence of a block cross is detected.

6. A data processing system according to claim 2, 3, 4, or 5, wherein said address-in-block generating means includes means for applying different address-in-block in said address registers to read out data having continuous addresses from said plurality of memory banks of said buffer memory means.

7. In a data processing system including main memory means for storing a plurality of instructions and data, and buffer memory means having a plurality of memory banks for storing a duplicate of a part of the contents of said main memory means in blocks each having a predetermined length, the improvement comprising:

instruction means for indicating an address of data and a length indication of said data to execute an instruction, said address data including a part indicating an address of a block and a part indicating an address within said block;

data length determining means responsive to said length indication from said instruction means for determining the length of the data to be fetched from said buffer means;

block-cross detecting means responsive to said address from said instruction means and said length information from said length determining means for detecting whether or not said data to be fetched from said buffer memory means with a single access is spread over a plurality of blocks; and address means for supplying an address for fetching data to each of said plurality of memory banks of said buffer memory means on the basis of said address from said instruction means, said address means including a plurality of address registers each for storing therein said address supplied to one of said plurality of memory banks, block address generating means for supplying a block address to said plurality of address registers on the basis of said address from said instruction means, and address-in-block generating means for supplying an address-in-block to said plurality of address registers on the basis of said address from said instruction means, said block address generating means including means for applying to one of said plurality of address registers an address of a block adjacent to a block indicated by said address from said instruction means in response to the detection of a block cross by said block-cross detecting means, and for applying the same address to all of said plurality of address registers in the absence of a detection of a block cross by said block-cross detecting means.

8. A data processing system according to claim 7, wherein said block address generating means includes next block address generating means for generating an address of a block adjacent to a block indicated by said address from said instruction means, and means for applying a block address from said next block address generating means to one of said plurality of address registers which is determined by an address-in-block indicated by said address from said instruction means, when the presence of a block cross is detected by said block-cross detecting means.

9. A data processing system according to claim 7, wherein said block address generating means includes means for applying an address of a block indicated by said address from said instruction means and an address of a block adjacent to said block in said plurality of address registers to read out data having continuous addresses from each of said plurality of memory banks of said buffer memory means, when the presence of a block cross is detected.

10. A data processing system according to claims 7, 8 or 9, wherein said address-in-block generating means includes means for applying different addresses-in-block into each of said plurality of address registers to read out data having continuous addresses from each of said plurality of memory banks of said buffer memory means.

11. In a data processing system including memory means having first and second memory banks for storing a plurality of instructions and data in blocks of predetermined length each consisting of a plurality of groups of data bytes, said first and second memory banks accommodating the odd and even groups of data within each block, and instruction means for indicating an address of data in said memory means having a block designating portion and a group designating portion and a length portion designating the length of said data, an address control circuit for addressing both of said first and second memory banks with a single access on the basis of said address from said instruction means and said length signal, comprising:

means including first and second address register for holding the addresses of successive data groups residing in said first and second memory banks, respectively;

address converting means responsive to a data address from said instruction means for inserting the block designating portion thereof into both of said first and second address registers; and address modifying means responsive to the group designating portion of said data address from said instruction means for inserting into one of said first and second address registers the unmodified group designating portion of said data address and into the other of said first and second address registers the group designating portion of the address of the next data group depending on whether said data address from said instruction means relates to an odd or even group of data, and including block-cross detecting means responsive to said data address from said instruction means and said length signal for detecting whether or not the data occupies more than one block in said memory means, said block address control means responsive to said block-cross detecting means detecting a block cross with respect to the data address from said instruction means for replacing the block designating portion in one of said first and second address registers with the block designating portion of the next data block in said memory means.

12. A data processing system according to claim 11, wherein said block-cross detecting means includes means for detecting whether said data address from said instruction means represents an address in the last group of a block in said memory means and means for determining whether the number of bytes in said group subsequent to said data address exceeds the number of bytes designated by said length signal.

* * * * *